United States Patent
Zhang et al.

(10) Patent No.: US 11,525,889 B2
(45) Date of Patent: Dec. 13, 2022

(54) NON-CONTACT METHOD FOR DETECTIING AND DISTINGUISHING HUMAN AND ANIMAL BASED ON IR-UWB BIO-RADAR SIGNAL

(71) Applicant: AIR FORCE MEDICAL UNIVERSITY, Shaanxi (CN)

(72) Inventors: Yang Zhang, Xi'an (CN); Jianqi Wang, Xi'an (CN); Fulai Liang, Xi'an (CN); Zhao Li, Xi'an (CN); Hao Lv, Xi'an (CN); Ziqi Zhang, Xi'an (CN); Xiao Yu, Xi'an (CN); Huijun Xue, Xi'an (CN); Teng Jiao, Xi'an (CN)

(73) Assignee: AIR FORCE MEDICAL UNIVERSITY, Xi'an (CN)

( * ) Notice: Subject to any disclaimer, the term of this patent is extended or adjusted under 35 U.S.C. 154(b) by 182 days.

(21) Appl. No.: 17/133,529

(22) Filed: Dec. 23, 2020

(65) Prior Publication Data

US 2022/0206111 A1    Jun. 30, 2022

(51) Int. Cl.
*G01S 7/41*    (2006.01)
*G01S 13/88*    (2006.01)
(Continued)

(52) U.S. Cl.
CPC ............ *G01S 7/411* (2013.01); *G01S 13/0209* (2013.01); *G01S 13/04* (2013.01); *G01S 13/88* (2013.01)

(58) Field of Classification Search
CPC .......... G01S 7/411; G01S 13/04; G01S 13/88; G01S 13/0209
See application file for complete search history.

(56) References Cited

PUBLICATIONS

Ma, Liang, Wang, Lv, Yu, Zhang, & Wang. (2019). An Accurate Method to Distinguish Between Stationary Human and Dog targets Under Through-Wall Condition Using UWB Radar. Remote Sensing, 11(21), 2571. doi: 10.3390/rs11212571 (Year: 2019).*

(Continued)

*Primary Examiner* — Vladimir Magloire
*Assistant Examiner* — Oladimeji Oyegunle
(74) *Attorney, Agent, or Firm* — W&G Law Group

(57) ABSTRACT

A non-contact method for detecting and distinguishing a human and an animal based on IR-UWB bio-radar signals includes: step 1, transmitting a radar pulse to a target by a transmitting antenna of an IR-UWB bio-radar; and obtaining, by a receiving antenna of the IR-UWB bio-radar, a radar echo signal E(n,m) generated from the radar pulse reflected on the target; step 2: performing signal preprocessing on the radar echo signal E(n,m) obtained in step 1, to obtain a first energy signal $E_6(l)$; step 3: removing a direct wave from $E_6(l)$ obtained in step 2 to obtain a second energy signal $E_7(l)$, and obtaining a maximum amplitude $E_{7max}$ of $E_7(l)$ and a position $l_{max}$ corresponding to the maximum amplitude in a slow time direction; step 4: calculating a peak-to-background ratio $V_{EtoB}$ of $E_7(l)$, calculating an average correlation coefficient $r_m$, and determining a type of the target through a target detection and distinction rule.

4 Claims, 7 Drawing Sheets

(51) Int. Cl.
    *G01S 13/02*     (2006.01)
    *G01S 13/04*     (2006.01)

(56) References Cited

PUBLICATIONS

Xue, H., Liu, M., Zhang, Y., Liang, F., Qi, F., & Chen, F. et al. (2017). An Algorithm Based Wavelet Entropy for Shadowing Effect of Human Detection Using Ultra-Wideband Bio-Radar. Sensors, 17(10), 2255. doi: 10.3390/s17102255 (Year: 2017).*

* cited by examiner

NON-CONTACT METHOD FOR DETECTING AND DISTINGUISHING HUMAN AND ANIMAL BASED ON IR-UWB BIO-RADAR SIGNAL

CROSS-REFERENCE TO RELATED APPLICATIONS

The present application claims priority to Chinese Patent Application No. 201911017732.0, filed on Oct. 24, 2019, the content of which is incorporated herein by reference in its entirety.

TECHNICAL FIELD

The present disclosure belongs to the field of bio-radar technologies, and specifically, to a non-contact method for detecting and distinguishing a human and an animal based on IR-UWB bio-radar signals.

BACKGROUND

Bio-radar is a technology which is capable of penetrating a certain medium to achieve functions such as life body detection, vital sign monitoring, life body imaging and positioning in a non-contact and long-distance manner, by extracting vital signs-related signals from radar echoes. A principle of bio-radar is that radar emits electromagnetic waves to a human body; the electromagnetic waves are reflected back to a radar receiving antenna after being modulated by human physiological activities such as breathing, heartbeat, and body movement; and after the radar receives the radar echo, physiological and biological information about a human target is obtained from the radar echo through a certain signal processing technology. These information includes physiological parameters, waveforms, images, target positions, etc. Because of having the above advantages, the bio-radar technology has shown great advantages and broad application prospects in fields of post-disaster rescue, medical monitoring, anti-terrorism and stability maintenance, and battlefield search and rescue.

At present, the detection research on bio-radar at home and abroad pays more attention to whether human targets is in the detection results, as well as other information such as the number, position, posture and contour of targets. However, actual problems encountered in search and rescue operations after disasters such as earthquakes are complex and diverse. For example, in the Wenchuan earthquake of 2008, a rescue team used a bio-search and rescue radar to detect a life signal under a rubble. After several hours of demolition and excavation by search and rescue officers and soldiers, it was found that a poultry was buried under the rubble. Therefore, in applications such as searching for missing persons in post-disaster rescue, it is not only desired to know whether there is a living body, but also whether the detected living body is a human or an animal. The accurate distinction and distinction of humans and animals is of great practical significance for scientifically formulating rescue plans, saving limited rescue forces and resources, improving an efficiency of search and rescue during a golden rescue period, enhancing search and rescue confidence of rescuers, and more accurately identifying and saving lives of survivors.

When transmitted signals of the UWB bio-radar are irradiated to a stationary object, echo signals of the radar are a stable fixed value. When transmitted signals of the UWB bio-radar are irradiated to life bodies such as humans or animals, raw radar echo signals are cause to fluctuate due to slight fluctuations of a body surface caused by breathing of the living body. In this way, life bodies can be detected through these tiny fluctuations, and differences in characteristics of slight fluctuations (characteristics such as energy amplitude, signal regularity, etc.) between humans and animals in the radar echo can be used to distinguish and discriminate between humans and animals.

SUMMARY

An object of the present disclosure is to provide a non-contact method for detecting and distinguishing a human and an animal based on IR-UWB bio-radar signals, to solve a problem of distinguishing and discriminating between the human and the animal.

In order to achieve above tasks, the present disclosure adopts following technical solutions.

A non-contact method for detecting and distinguishing a human and an animal based on IR-UWB bio-radar signals includes:

step 1: transmitting a radar pulse to a target by a transmitting antenna of an IR-UWB bio-radar, obtaining a radar echo signal $E(n,m)$ through a receiving antenna of the IR-UWB bio-radar, where the radar echo signal is generated from the radar pulse reflected on the target, m is a sampling ordinal number in a fast time direction, n is a sampling ordinal number in a slow time direction, and m and n are positive integers;

step 2: performing signal preprocessing on the radar echo signal $E(n,m)$ obtained in the step 1, to obtain a first energy signal $E_6(l)$;

step 3: removing a direct wave from the first energy signal $E_6(l)$ obtained in the step 2 to obtain a second energy signal $E_7(l)$, obtaining a maximum amplitude value $E_{7max}$ of the second energy signal $E_7(l)$ and a position $I_{max}$ corresponding to the maximum value in the slow time direction;

step 4: calculating a peak-to-background ratio $V_{EtoB}$ of the second energy signal $E_7(l)$, and calculating an average correlation coefficient $r_m$, and determining a type of the target through a target detection and distinction rule, where the target detection and distinction rule includes:

a) if $V_{EtoB} < \sigma_N$, a determination result is no target;

b) if $\sigma_N \le V_{EtoB} < \sigma_Y$ and $r_m < \sigma_{rm1}$ the determination result is no target;

c) if $V_{EtoB} \ge \sigma_Y$, the determination result is a human target;

d) if $S_{thres} \le V_{EtoB} < \sigma_Y$ and $r_m > \sigma_{rm2}$, the determination result is a human target; and f) in cases other than a), b), c) and d), the determination result is an animal target, where $\sigma_N$ represents a no target threshold; $\sigma_Y$ represents a human target threshold; $S_{thres}$ represents a sensitivity threshold and $\sigma_N < S_{thres} < \sigma_Y$; $\sigma_N$, $\sigma_Y$, and $S_{thres}$ are larger than 1; $\sigma_{rm1}$ represent a weak correlation threshold; $\sigma_{rm2}$ represents a strong correlation threshold and $\sigma_{rm1} < \sigma_{rm2}$; $\sigma_{rm1}$ and $\sigma_{rm2}$ are both larger than 0 and smaller than 1.

Further, in the step 4, $\sigma_N=1.65$, $\sigma_Y=8$, $\sigma_{rm1}=0.45$, $\sigma_{rm2}=0.92$, $S_{thres}=\{2, 3, 3.8\}$.

Further, the signal preprocessing in the step 2 includes following sub-steps:

step 2.1: performing a distance accumulation on the radar echo signal $E(n,m)$;

step 2.2: multiplying a signal after the distance accumulation in the step 2.1 by an exponential gain curve G(l) of a formula I, to perform attenuation compensation, $$G(l) = \exp\left(\frac{lg(V_h)}{P} \times l\right) \quad \text{Formula I}$$

where $V_h$ represents a ratio of the maximum value of the radar echo data to an amplitude of a target reflection echo, P represents a target position in units of m, l represents a fast time ordinal number after the distance accumulation, l=1, 2, . . . , L, and L is a positive integer;

step 2.3: removing a static clutter from the signal after the attenuation compensation in the step 2.2;

step 2.4: performing a linear trend subtraction from the signal after the static clutter is removed in the step 2.3;

step 2.5: performing, in the slow time dimension, low-pass filtering on the signal after the linear trend subtraction in the step 2.4;

step 2.6: accumulating, along a slow time axis, the signal after the low-pass filtering in the step 2.5, to obtain the first energy signal $E_6(l)$.

Further, the average correlation coefficient $r_m$ at a position of the maximum amplitude is calculated and obtained by a formula II:

$$\begin{cases} r_i = \dfrac{\sum_{q=1}^{Q}(E_{(max+(i-4))}(q) - \overline{E_{(max+(i-4))}(q)})(E_{max}(q) - \overline{E_{max}(q)})}{\sqrt{\sum_{q=1}^{Q}(E_{(max+(i-4))}(q) - \overline{E_{(max+(i-4))}(q)})^2}\sqrt{\sum_{q=1}^{Q}(E_{max}(q) - \overline{E_{max}(q)})^2}}, & i \leq 3 \\ r_i = \dfrac{\sum_{q=1}^{Q}(E_{(max+(i-3))}(q) - \overline{E_{(max+(i-3))}(q)})(E_{max}(q) - \overline{E_{max}(q)})}{\sqrt{\sum_{q=1}^{Q}(E_{(max+(i-3))}(q) - \overline{E_{(max+(i-3))}(q)})^2}\sqrt{\sum_{q=1}^{Q}(E_{max}(q) - \overline{E_{max}(q)})^2}}, & i \geq 4 \\ r_m = \dfrac{1}{6}\sum_{i=1}^{6} r_i \end{cases} \quad \text{Formula II}$$

where i represents an ordinal number of correlation coefficient and i=1, 2, 3, 4, 5, 6, $E_5(l,q)$ represents a signal of a middle channel after the low-pass filtering in the slow time dimension obtained in the step 2.5, $E_{max}(q)$ represents a signal at a position of the maximum of $E_5(l,q)$, $E_{(max+(i-4))}(q)$ represents signals at the first three positions adjacent to the position of the maximum of $E_5(l,q)$, $E_{(max+(i-3))}(q)$ represents signals at the last three positions adjacent to the position of the maximum value of $E_5(l,q)$, Q represents the total number of sampling points of the signal of $E_5(l,q)$ in the slow time direction and Q is a positive integer, and q represents the q-th signal sampling point in the slow time direction and q is a positive integer.

Compared with the related art, the present disclosure has following technical characteristics.

1. In the disclosure, according to signal characteristics of human and animal breathing, a set of target detection and distinction procedures that combine two characteristic parameters of energy-to-noise ratio and the correlation coefficient average, and multiple thresholds, is mainly adopted to realize detection and distinction between a human and an animal, and to give a distance to the target.

2. In the present disclosure, the problem of energy attenuation with increasing the distance in the transmission process of radar signals is solved, by pre-determining the target position and by performing attenuation compensation on the signal in the distance upwards according to the calculated exponential gain curve G(l). In this way, a miss-detection rate of a target in the distance is effectively reduced. In addition, compared with the segmental linear gain compensation method, the gain compensation adopted by the present disclosure is more accurate.

3. Physical significances, formulas, and calculation methods of the two characteristic parameters of the energy-to-noise ratio and the correlation coefficient average is provided according to the present disclosure, to give an optimal distinction threshold of each parameter on this basis. Under this optimal threshold condition, the detection and distinction method proposed by the present disclosure can distinguish a human from animals such as dogs, cats, and poultry with a high recognition accuracy rate.

BRIEF DESCRIPTION OF DRAWINGS

FIG. 3 (b) shows a waveform of slow time signals;

DESCRIPTION OF EMBODIMENTS

First, technical terms appearing in the present disclosure are explained.

Bio-radar technology includes a continuous wave (CW) radar and an ultra-wideband (UWB) radar, in which an ultra-wideband bio-radar becomes the mainstream of current bio-radar technology research due to its high distance-resolution and target recognition ability. An impulse-radio Ultra-wideband (IR-UWB) radar has become a research hotspot in post-disaster search and rescue fields due to its excellent performance and simple structure. Therefore, identification and distinction between a human and an animal is realized by an IR-UWB bio-radar system.

Slow time is a detection time of the radar on a target, in units of second (s).

Fast time is a propagation time of a pulse, in units of nanosecond (ns).

Figure 3A:
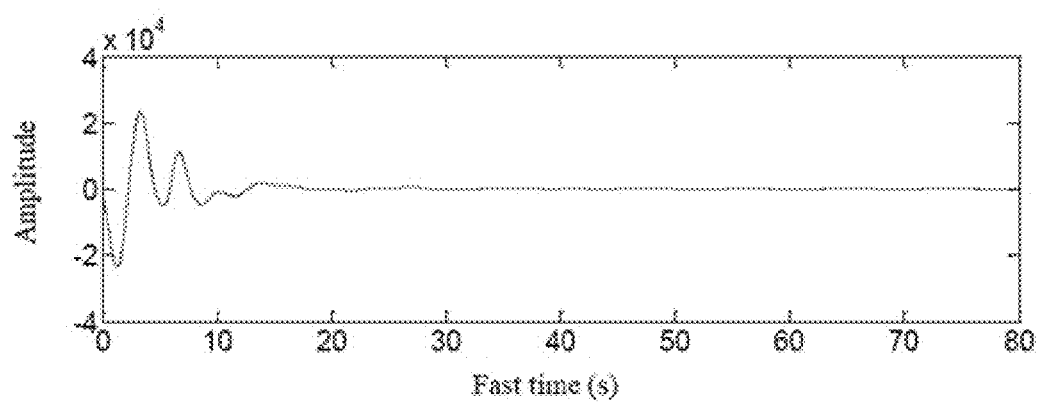
FIG. 3 (a) shows a waveform of fast time signals.
Figure 3B:
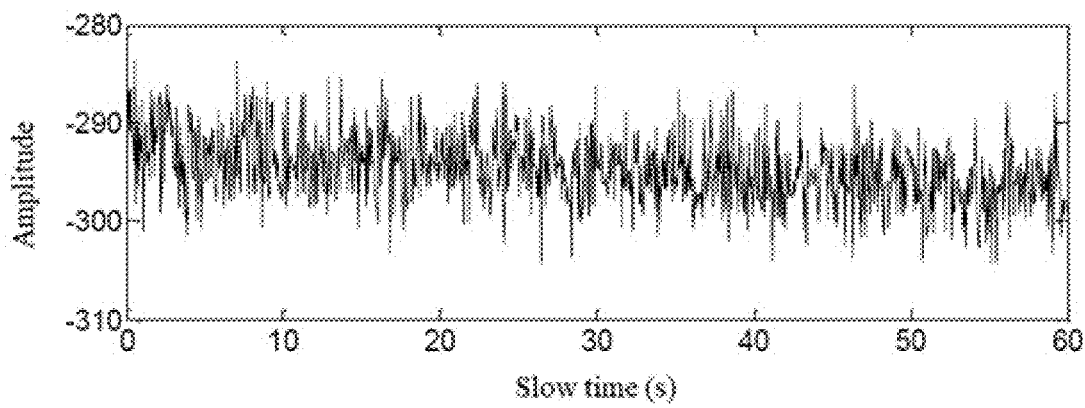

As shown in FIG. 3(a) and FIG. 3(b), in actual detection, an echo signal sampled by the IR-UWB radar is sampled, integrated and amplified, and then is stored in a two-dimensional matrix R(m,n), where m is a row vector, n is a column vector. In FIG. 3(a) and FIG. 3(b), a horizontal axis represents the slow time, and a vertical axis represents the fast time. The fast time can be converted into a detection distance according to a propagation speed of an electromagnetic wave in a medium, in units of meter (m).

A calculation relationship between the fast time and the distance is: distance (m)=fast time (ns)×propagation speed of electromagnetic wave in medium (m/ns)/2.

Fast time signal is a signal at a certain moment, along a fast time dimension, that is, the column vector of the two-dimensional matrix.

Slow time signal is a signal at a certain distance point, along a slow time dimension, that is, the row vector of the two-dimensional matrix.

A principle of the present disclosure is that when a signal transmitted by the bio-radar irradiates a stationary object, a radar echo signal is a stable fixed value; but when it irradiates living bodies such as humans or animals, fluctuations are caused to appear in a raw radar echo signal, due to slight fluctuations of a body surface caused by breathing of the living body or the like. Thus, the living bodies can be detected through these slight fluctuations.

Figure 1:
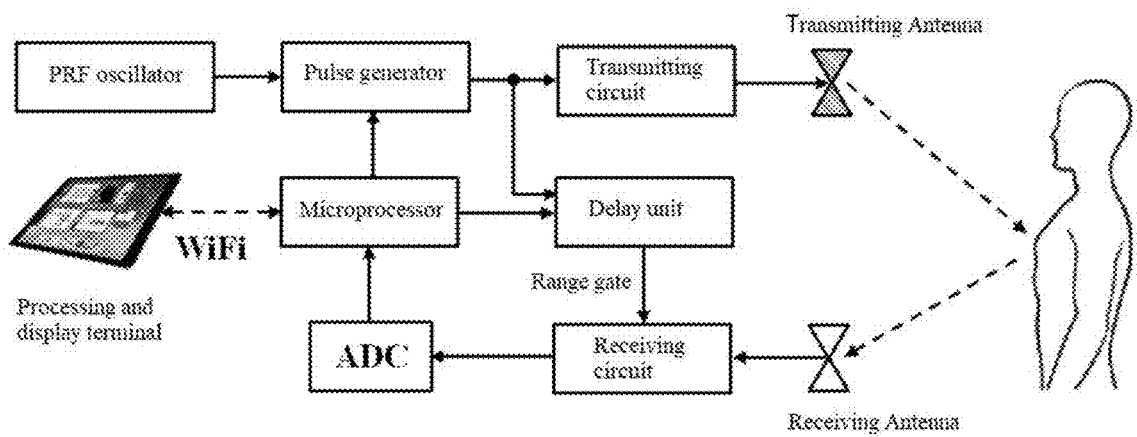
FIG. 1 is a block diagram of a principle of an IR-UWB bio-radar system.
Figure 2:
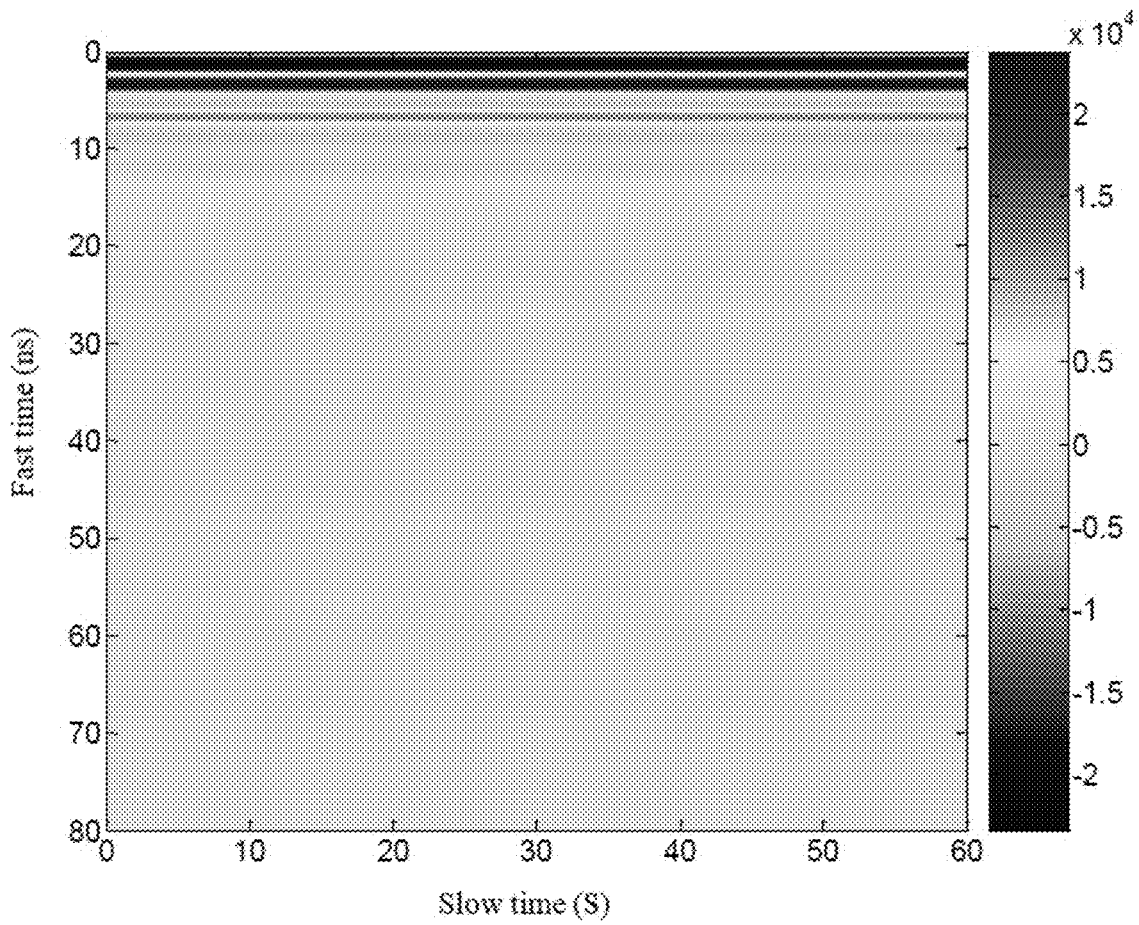
FIG. 2 is a schematic diagram of a two-dimensional matrix of radar echo signals.

An IR-UWB bio-radar system is provided according to the present disclosure. A structural block diagram of the system is as shown in FIG. 1. A pulse generator generates pulse signals with a certain pulse repeat frequency (PRF). The generated pulse signal is divided into two paths: one path of the pulse signal is formed into a bipolar pulse signal through an adjustment of a transmitting circuit and radiated out through a transmitting antenna; the other path of the pulse signal is sent to a delay unit, to generate a series of range gates having an adjustable delay time under the control of a microprocessor. The range gate is actually a sampling pulse signal having a very short duration. Under trigger of this signal, a receiving circuit can selectively receive and sample the radar echo. The signal radiated by the transmitting antenna is reflected when it encounters an object. A reflected radar echo is received by a receiving antenna; sent to the receiving circuit to be selectively sampled, integrated, and amplified under the trigger of the range gate; and then forms a radar echo signal through an Analog to Digital Converter (ADC). The radar echo signal is sent, under the control of the microprocessor, to a processing and display terminal via a WiFi module, for signal processing and result display.

FIGS. 3(a) and (b) show waveforms of the fast time signal and the slow time signal of the radar echo, respectively. A width of a time window of the IR-UWB radar determines a length of the fast time signal. In an experimental setup of the present disclosure, the width of the time window of one fast time signal is set to 80 ns, which corresponds to a detection distance in a range of 12 m. Each fast time signal consists of 8192 sampling points, and a time interval between every two fast time signals is $T_s=0.0625$ s. In other words, a sampling frequency of the slow time signal is $f_s=1/T_s=16$ Hz, which satisfies requirements of Nyquist sampling law for human breathing signal sampling.

In this embodiment, a non-contact method for detecting and distinguishing a human and an animal based on IR-UWB bio-radar signals is disclosed. The non-contact method includes following steps.

In step 1, the transmitting antenna of the IR-UWB bio-radar transmits a radar pulse to a target, and the radar pulse is reflected by the target, a radar echo signal E(n,m) is obtained through the receiving antenna of the IR-UWB bio-radar, where m is a sampling ordinal number in the fast time direction, n is a sampling ordinal number in the slow time direction, and m and n are positive integers.

In step 2, signal preprocessing is performed on the radar echo signal E(n,m) obtained in step 1, to obtain an energy signal $E_6(l)$.

In step 3, a direct wave of the $E_6(l)$ obtained in step 2 is removed to obtain an energy signal $E_7(l)$, a maximum amplitude value $E_{7max}$ of $E_7(l)$ and a position corresponding to the maximum amplitude value in the slow time direction are obtained, a distance from the target to the radar is obtained according to $l_{max}$; a total number of sampling points corresponds to a total distance, a proportion of the sampling points corresponding to $l_{max}$ in the total sampling points corresponds to a proportion of the distance from the target to the radar in the total distance, so as to obtain the distance from the target to the radar.

After a series of signal processing above, an amplitude of the energy signal is closely related to a life signal of a living body. The larger the amplitude, the stronger the micro-motion signal of a life at this distance, the more likely it is a human or animal target;

In step 4, a peak-to-background ratio $V_{EtoB}$ of $E_7(l)$ and an average correlation coefficient $r_m$ are calculated, and a type of the target is determined through a target detection and distinction rule, and the target detection and distinction rule includes:

a) if $V_{EtoB}<\sigma_N$, a determination result is no target;

b) if $\sigma_N \leq V_{EtoB}<\sigma_Y$ and $r_m<\sigma_{rm1}$ the determination result is no target;

c) if $V_{EtoB} \geq \sigma_Y$, the determination result is a human target;

d) if $S_{thres} \leq V_{EtoB}<\sigma_Y$ and $r_m>\sigma_{rm2}$, the determination result is a human target; and f) in cases other than a), b), c) and d), the determination result is an animal target, where $\sigma_N$ represents a no target threshold; $\sigma_Y$ represents a human target threshold; $S_{thres}$ represents a sensitivity threshold and $\sigma_N<S_{thres}<\sigma_Y$; $\sigma_N$, $\sigma_Y$, and $S_{thres}$ are larger than 1; $\sigma_{rm1}$ represent a weak correlation threshold; $\sigma_{rm2}$ represents a strong correlation threshold and $\sigma_{rm1}<\sigma_{rm2}$; $\sigma_{rm1}$ and $\sigma_{rm2}$ are both larger than 0 and smaller than 1.

In an embodiment, in step 4, $\sigma_N=1.65$, $\sigma_Y=8$, $\sigma_{rm1}=0.45$, $\sigma_{rm2}=0.92$, $S_{thres}$ {2, 3, 3.8}. Three levels of the sensitivity threshold $S_{thres}$ are set. According to different detection sensitivity requirements, a bio-radar operator can set three different levels of the sensitivity threshold. When the sensitivity threshold $S_{thres}$=2, the bio-radar has the highest detection sensitivity, and the bio-radar has the lowest detection sensitivity when $S_{thres}$=3.8.

The no target threshold and the human target threshold are obtained by a formula I:

$$\sigma_{V_{EtoB}} = a \times \frac{\text{area of chest wall of target} \times \text{amplitude of breathing of target}}{\text{energy level of background signal(with noise)}} = a \times \frac{S \times A}{BN} \quad \text{Formula I}$$

In the formula I, a is a constant coefficient. In case of no target, a ratio of the maximum amplitude value of signal to the background noise is about 1.65 or smaller than 1.65. That is, in this case, the maximum amplitude value of signal is more than 1 time of the background noise. Energy levels of the maximum amplitude value of signal and the background noise are basically the same, and the waveform of the signal presents a shape close to the waveform of the background noise without obvious peaks. When the target is a human target, rise and fall of a body surface of a chest caused by human breathing movement cause the signal amplitude to increase at the target distance. In this time, the ratio of the maximum amplitude value of the signal to the background noise is more than 2 times (which is different according to chest wall area, breathing amplitude, background signal energy level of the target). In some scenarios, the ratio can even reach above 8. In this case, the maximum amplitude value of the signal has an obviously larger energy level than the background noise, and the waveform of the signal presents a significant peak shape at the target distance.

The weak correlation threshold and the strong correlation threshold are obtained by formula II:

$$\sigma_r = b \times \frac{\text{thickness of chest wall of target} \times \text{regularity level of breathing of target}}{\text{level of noise}} = b \times \frac{L \times R}{N} \quad \text{Formula II}$$

In the formula II, b is a constant coefficient. The weak correlation threshold and the strong correlation threshold are determined according to measured data of a certain amount of samples in an experiment. When the two thresholds are respectively 0.45 and 0.92, a distinction among humans, animals and no targets has the best effect.

Specifically, a method for obtaining the radar echo signal in step 1 is as below.

Figure 4:
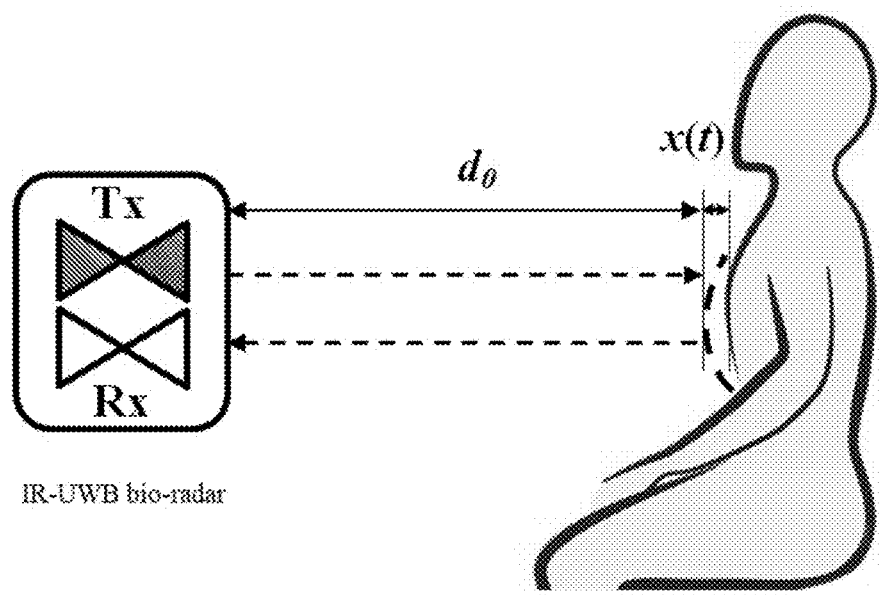
FIG. 4 is a schematic diagram of IR-UWB radar detecting human breathing.

A schematic diagram of the IR-UWB radar detecting human breathing is as shown in FIG. 4. It is assumed that an initial distance between a surface of a chest wall of a human target and the radar is do. Breathing of the human body will cause a chest cavity to expand and contract periodically. In normal circumstances, a displacement of a wall of the chest cavity when the human body breathes is a sine function x(t) with respect to the slow time. Thus, an actual distance d(t) between the surface of the chest wall of the human target and the radar will periodically change around do according to a breathing frequency fr of the human body:

$$d(t) = d_0 + x(t) = d_0 + Ar \sin(2\pi f_r t)$$

where t represents the slow time, x(t) represents change in the displacement of the chest wall during human breathing, and Ar represents the maximum amplitude of human breathing.

In the detection range, an environment is static, the human target also stays still, and only chest wall movement is caused by breathing. Thus, impulse response $h(t,\tau)$ of the radar system will change with time, like breathing movement:

$$h(t, \tau) = \sum_i \alpha_i \delta(\tau - \tau_i) + \alpha_v \delta(\tau - \tau_v(t))$$

In the formula, t represents the slow time, T represents the fast time;

$$\sum_i \alpha_i \delta(\tau - \tau_i)$$

represents a pulse echo component of a static background target, where $\alpha i$ and $\tau i$ are respectively an amplitude of the pulse echo of the i-th static target and a delay in the fast time dimension of the pulse echo of the i-th static target; $\alpha_v \delta(\tau - \tau(t))$ represents a pulse echo component of the breathing movement of the human target, where $\alpha_v$ is an amplitude of the pulse echo, $\tau_v(t)$ is a delay change of the pulse echo of the human target in the fast time dimension, and it can be expressed as:

$$\tau_v(t) = \frac{d(t)}{c} = \frac{d_0 + Ar \sin(2\pi f_r t)}{c} = \tau_0 + \tau_r \sin(2\pi f_r t),$$

where c is a propagation speed of electromagnetic waves in vacuum, $\tau_r$ is a maximum delay of breathing movement in the fast time dimension, $\tau_0$ is a delay of radar waves between the surface of the chest wall of the human body and the radar (an initial distance), namely $$\frac{d_0}{c}.$$

If the pulse distortion and other non-linear effects are ignored, the radar echo signal can be regarded as a convolution of the transmitted pulse of the radar and system impulse response. Then, without considering noise, the radar echo signal at a moment oft is:

$$E(\tau, t) = p(\tau) * h(t, \tau) = \sum_i \alpha_i p(\tau - \tau_i) + \alpha_v p(\tau - \tau_v(t)).$$

In this formula, $p(\tau)$ is a transmission pulse of the radar, and "*" means a convolution operation.

Figure 5:
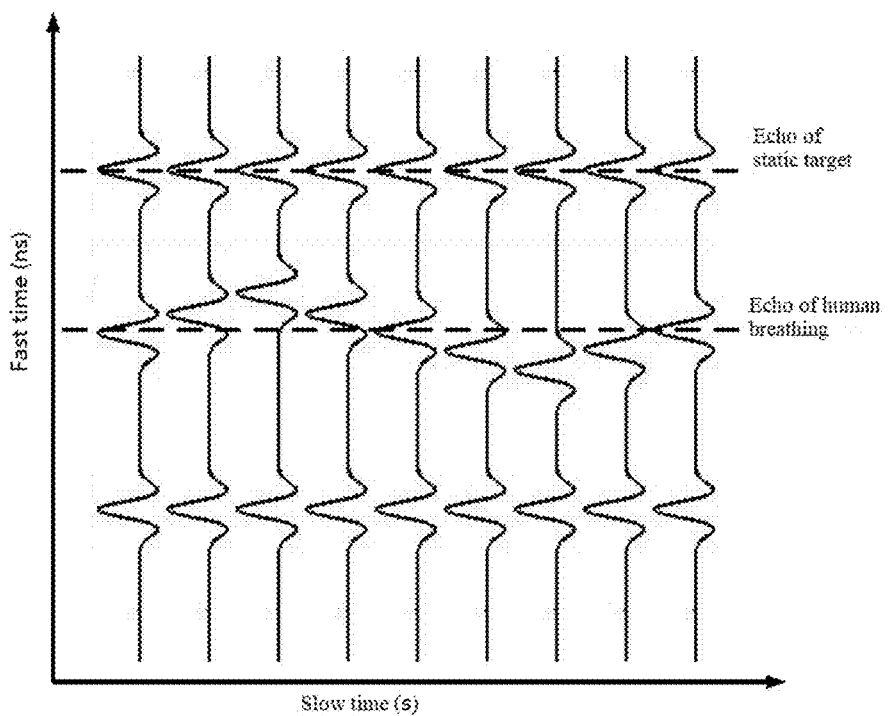
FIG. 5 is a schematic diagram of a pulse echo of human breathing.
Figure 6:
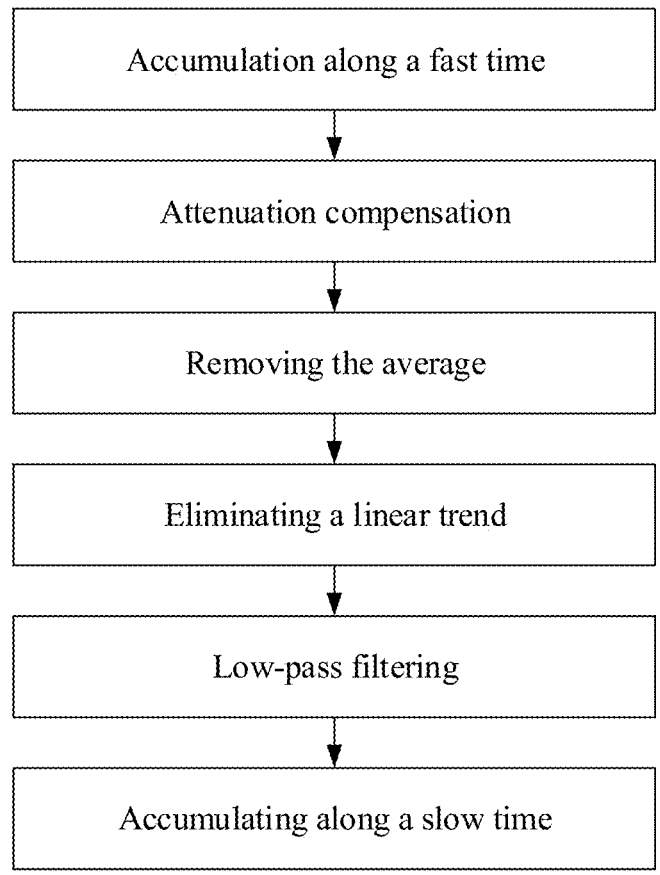
FIG. 6 is a flowchart of a signal preprocessing algorithm.

To explain the signal model more clearly, a schematic diagram of the pulse echo of human breathing is as shown in FIG. 5. It can be seen from FIG. 5 that the delay of the pulse echo of human breathing in the fast time dimension changes with the slow time, while the delay of the echo delay of the static target is constant.

In actual detection, the IR-UWB radar system samples respective points on each pulse waveform at discrete moments $\tau=mT_f$ (m=1, 2, ..., M) in the fast time direction, while samples the pulse waveform once at each discrete moment $t=nT_s$ (n=1, 2, ..., N) in the slow time direction. The sampled echo signals are stored as a (M×N) two-dimensional array E, and elements in the array E are represented by E(n,m):

$$E(n, m) = \sum_i \alpha_i p(mT_f - \tau_i) + \alpha_v p(mT_f - \tau_v(nT_s)),$$

where the signal E(n,m) is a two-dimensional signal, m is a sampling ordinal number in the fast time direction, and n is a sampling ordinal number in the slow time direction.

Specifically, the signal preprocessing in step 2 includes following sub-steps.

In step 2.1, a distance accumulation is performed on E(n,m), taking a middle channel as an example.

The IR-UWB radar system used in this study has 8192 sampling points and a time window of 80 ns. Thus, if raw radar echo data is directly processed, an amount of computation is large and operation is slow, which is disadvantageous to real-time of detection and recognition. In two-dimensional raw echo data E(n,m) received by the IR-UWB radar, modulation methods of radar echoes at adjacent distance points in the fast time dimension are roughly the same and have a certain correlation. Thus, under a premise of not affecting useful information, the distance accumulation can be performed on the raw radar echo data E(n,m) in the fast time dimension:

$$E_1(l, n) = \frac{1}{Q} \sum_{m=Q(l-1)+1}^{Ql} E(m, n),$$

where $E_1(l,n)$ (l=1, 2, ... L) is echo data after the distance accumulation; Q is a window width accumulated in the fast time dimension; L is the number of distance points in the fast time dimension after accumulation, and $$L = \left\lfloor \frac{M}{Q} \right\rfloor,$$

where "⌊ ⌋" means rounding down. A large number of experimental studies show that an algorithm achieves the best results when the window width Q=40. After the distance accumulation, the slow time signals on the 8192 corresponding distance points of the raw echo data E(m, n) are reduced to the fast time signals on the 200 (that is, L=200) corresponding distance points of $E_1(l,n)$, thereby reducing the amount of computation in the radar data processing process to a great extent, decreasing computation time required for detection, and improving a detection efficiency. Moreover, the distance accumulation along the fast time dimension is also equivalent to smoothing and filtering the fast time signals of the radar echo, which can suppress high frequency interference on the fast time signal to a certain extent.

In step 2.2, the signal after the distance accumulation in step 2.1 is multiplied by an exponential gain curve G(l) of the formula III to perform attenuation compensation:

$$G(l) = \exp\left(\frac{lg(V_h)}{P} \times l\right) \quad \text{Formula III}$$

where $V_h$ represents a ratio of the maximum of the radar echo data to an amplitude of the target reflection echo, P is a target position in units of m, l represents a fast time ordinal number after the distance accumulation, l=1, 2, ..., L, and L is a positive integer.

As the radar wave is severely attenuated in the medium propagation process, an amplitude of an echo reflected on an object interface in a distance will be greatly reduced. Thus, the object in the distance will difficult to be detected. It is necessary to compensate the radar echo $E_1(l,n)$ after the distance accumulation before identifying the echo reflected on an interface. Current ultra-wide spectrum radars (mainly ground penetrating radars) have automatic gain adjustment functions, to amplify the echo data reflected on the object in the distance through segmental linear or exponential gain adjustment on the radar echo. However, due to lack of prior knowledge of interface information of electromagnetic wave propagation medium, accuracy of gain calculation has a poor accuracy. Noises may be over-amplified due to the inaccurate gain, whereas the real echo reflected on the interface cannot be properly amplified because of the relatively small gain, ultimately leading to a greatly increased probability of the target being misjudged and miss-judged.

The method of segmental compensation for attenuation needs to calculate different gains for possible attenuation of each segment of the echo, and the calculation process is too complicated. However, it is difficult to calculate the gain accurately, and it is easily affected by noise, leading to wrong compensation. In actual detection, a position of the human target can be detected and calculated at first without the compensation, which is used as prior knowledge. Due to an exponential attenuation of the electromagnetic waves during propagation in the medium, the position of the human target and the corresponding reflected echo amplitude are taken as a compensation benchmark, and the method of the exponential gain compensation is adopted to perform attenuation compensation for the radar echo data in the fast time dimension. After the compensation, the signal is processed again according to the signal processing flow, and the target is detected and distinguished.

The calculation method of the gain curve is as follows.

It is assumed that the ideal exponential gain curve looks like $e^{K \times t}$, where K is an unknown constant. For the preprocessed data, the maximum $A_{max}$ (usually the maximum of the radar echo data) of $E_1(l,n)$ is divided by an amplitude $A_{human}$ of the reflection echo of the human target (that is, an amplitude of the radar echo data corresponding to the human target position $P_{human}$), to obtain a ratio $V_h$. Taking this ratio $V_h$ as an ideal gain value at the radar echo position of $P_{human}$, the exponential gain curve that changes with the fast time ordinal number l can be calculated. The calculated exponential gain curve is multiplied with the radar echo data on the fast time axis, to realize the attenuation compensation of the radar echo data. The signal after the attenuation compensation is $E_2(l,n)$, and $E_2(l,n)=G(l)E_1(l,n)$.

In step 2.3, static clutter is removed from the signal after the attenuation compensation in Step 2.2.

In the radar-based life detection process, a direct wave of the radar and a reflection of stationary objects within the detection range will form strong background clutters in the radar echo signal. The breathing signal of the human target is very weak, which is easy to be submerged by these background clutters. As shown in FIG. 3(a) and FIG. 3(b), in the raw radar echo, the life signal of the human target can hardly be seen, and only the background clutters can be seen. In an ideal condition, these background clutters are static, called static clutter, while only the life signal of the human target changes over time. Thus, the static clutter can be completely filtered out by subtracting an average of the slow time signal of the echo, leaving only the life signal of the human body:

$$E_3(l, n) = E_2(l, n) - \frac{1}{N}\sum_{n=1}^{N} E_2(l, n),$$

where $E_3(l,n)$ is a radar echo signal after the background is removed.

Figure 7:
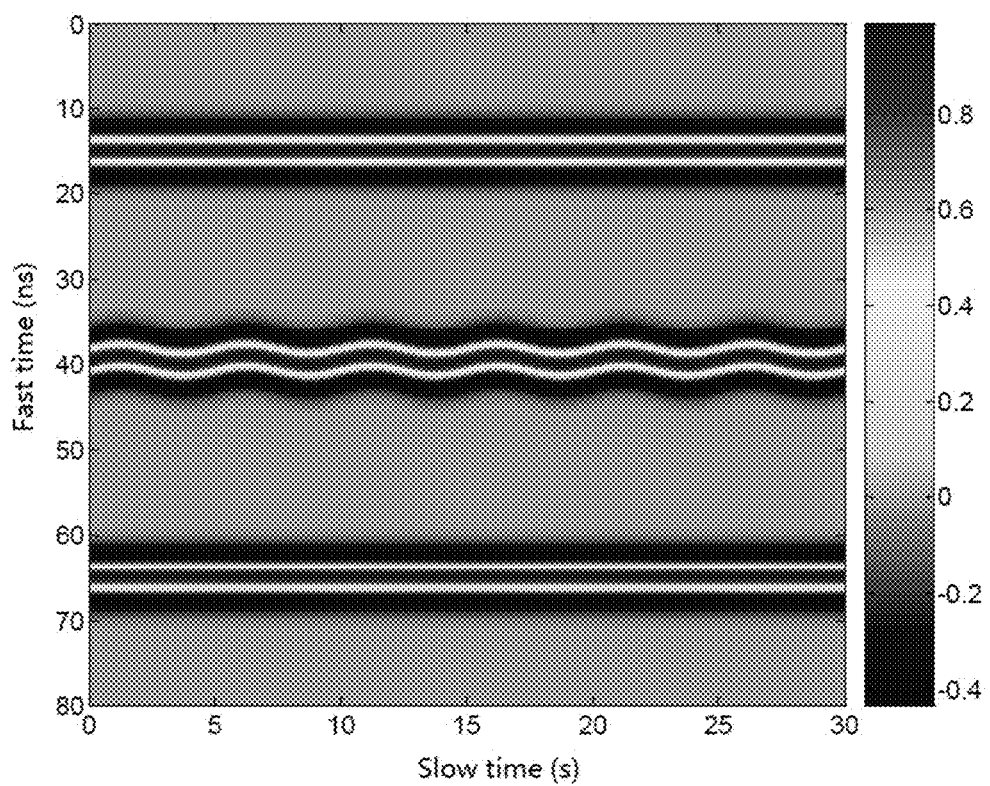
FIG. 7 is a schematic diagram of simulated echo signals of a radar.
Figure 8:
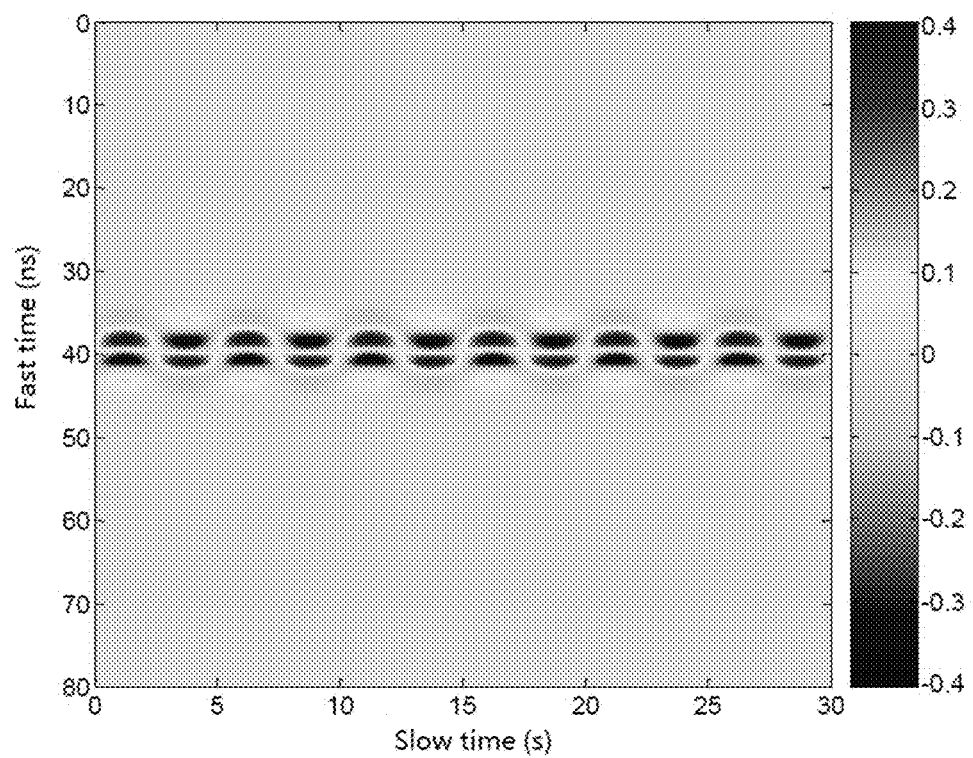
FIG. 8 is a schematic diagram of simulated echo signals after static clutter is removed.
Figure 9:
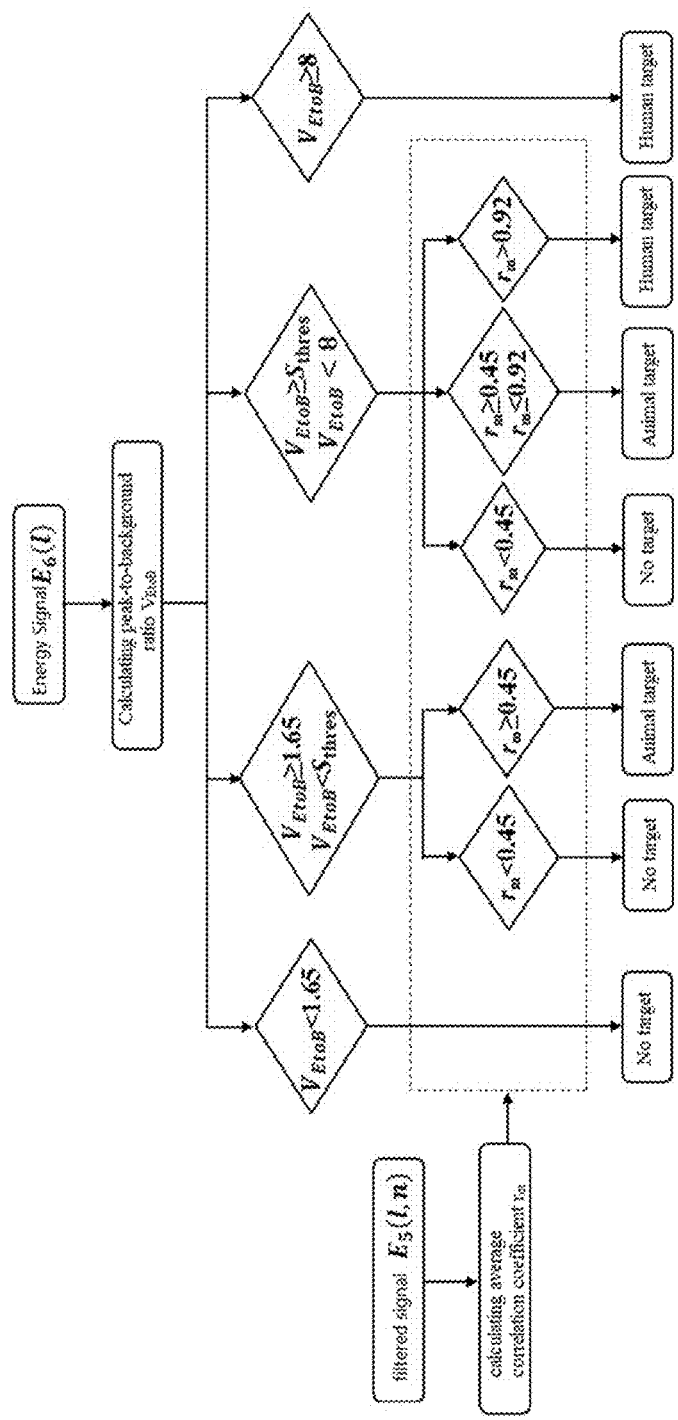
FIG. 9 is a flow chart of a method for detecting and distinguishing a human and an animal.
Figure 10:
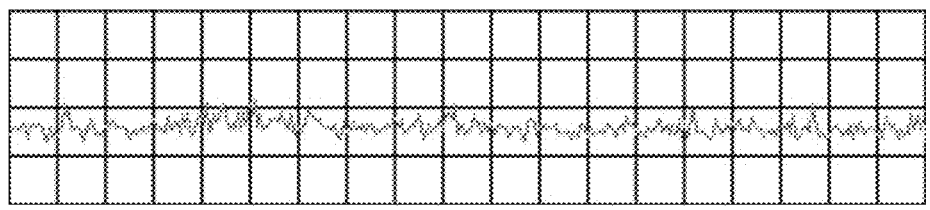
FIG. 10 is a schematic diagram of an energy signal $E_6(l)$ according to a first embodiment.
Figure 11:
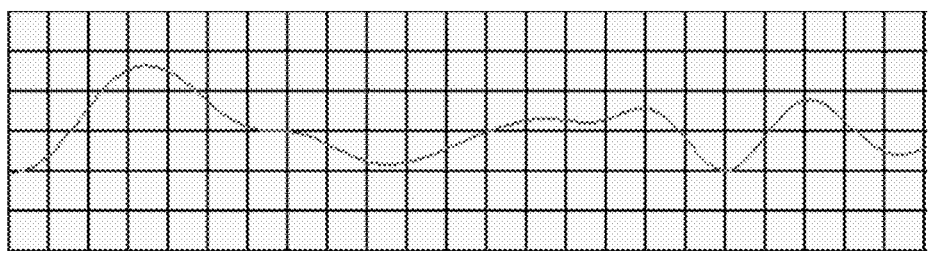
FIG. 11 is a schematic diagram of a slow time signal $E_{max}(n)$ at a position of a maximum value according to a first embodiment 1.
Figure 12:
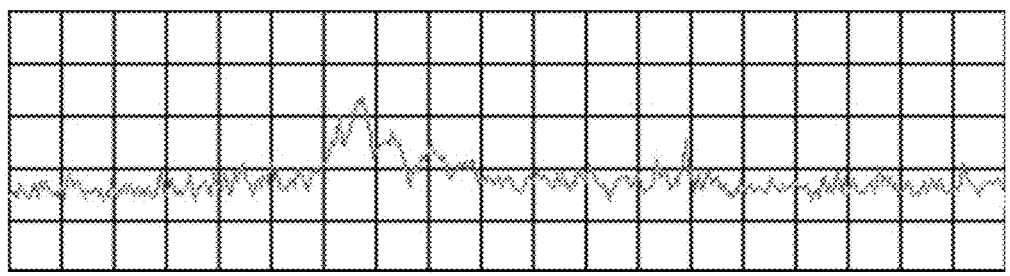
FIG. 12 is a schematic diagram of an energy signal $E_6(l)$ according to a second embodiment.
Figure 13:
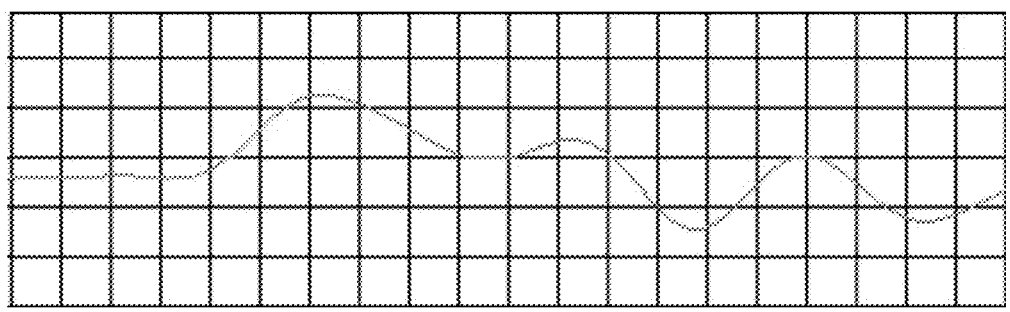
FIG. 13 is a schematic diagram of a slow time signal $E_{max}(n)$ at a position of a maximum value according to a second embodiment.
Figure 14:
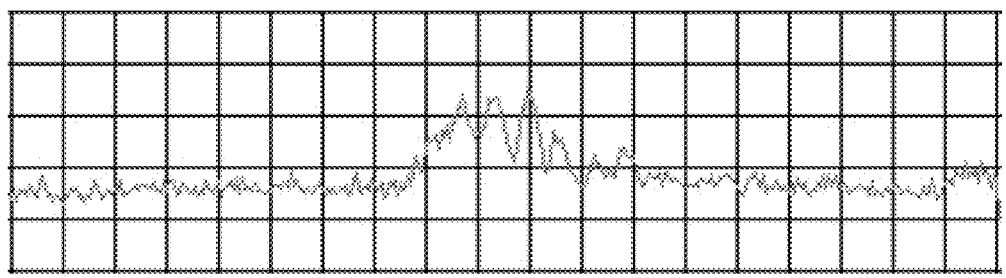
FIG. 14 is a schematic diagram of an energy signal $E_6(l)$ according to a third embodiment.
Figure 15:
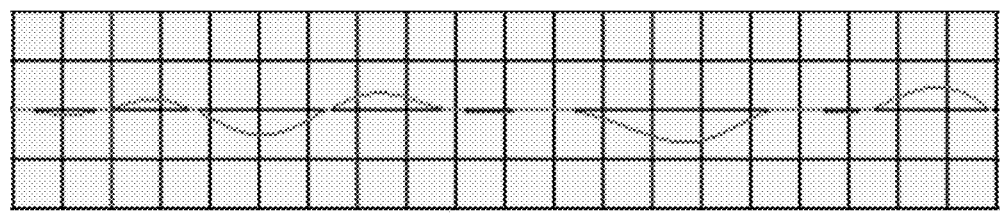
FIG. 15 is a schematic diagram of a slow time signal $E_{max}(n)$ at a position of a maximum value according to the third embodiment.
Figure 16:
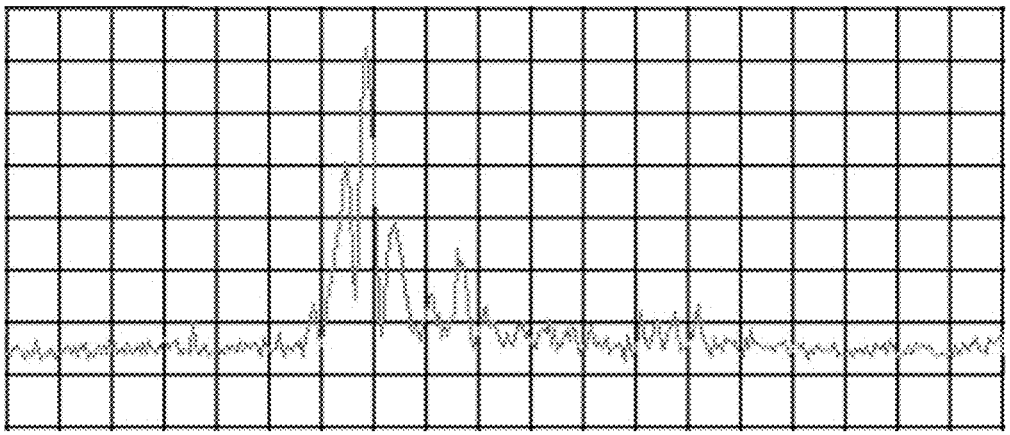
FIG. 16 is a schematic diagram of an energy signal $E_6(l)$ according to a fourth embodiment.
Figure 17:
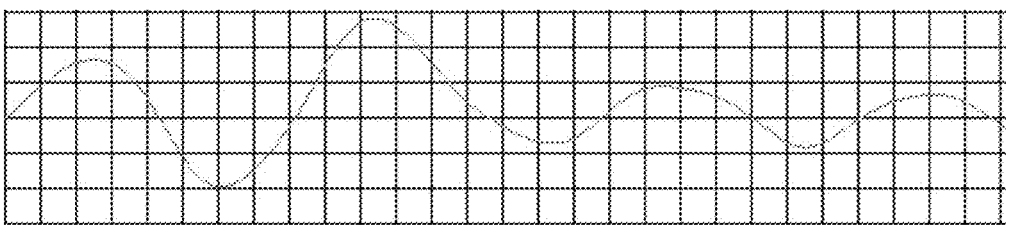
FIG. 17 is a schematic diagram of a slow time signal $E_{max}(n)$ at a position of a maximum value according to a fourth embodiment.

FIG. 7 is a two-dimensional radar signal simulated by a matlab software. It can be seen from FIG. 7 that there are static clutters near 15 ns and 65 ns, which do not change with the slow time, while the breathing signal of the human target around 40 ns changes regularly along the slow time dimension. After the average removing method is applied to the simulated two-dimensional radar signal to eliminate the static clutters, a component of the static clutter in the echo is completely removed, leaving only the breathing signal of the human target, as shown in FIG. 8.

In step 2.4, a linear trend subtraction is performed from the signal after the static clutter is removed in step 2.3.

The hardware of the IR-UWB radar system is often accompanied by a baseline drift of the echo in the data acquisition process. The linear baseline drift will cause energy leakage of the echo data in a low frequency band, thereby affecting the detection and recognition of the breathing signal of the human target. Therefore, in the present disclosure, a linear trend subtraction (LTS) is used to remove the linear baseline drift in the radar echo signal. LTS estimates, through linear least squares fitting, a direct-current component of the echo signal $E_3(l,n)$ in the slow time dimension and a low-frequency linear drift trend, which is subtracted from the echo data:

$$E_4^T = E_3^T - y(y^T y)^{-1} y^T E_3^T,$$

In the formula, $E_4$ represents the radar data after the LTS processing, $E_3$ represents the radar data $E_3(l,n)$ after removing the average; $E_4^T$ and $E_3^T$ are their transposed determinants respectively.

$$y = [\frac{n}{N}, 1_N],$$

$n=[0, 1, 2 \ldots, N-1]^T$, here y is a determinant with N rows and 2 columns, $1_N$ is a column vector having a length of N and having all elements being 1, and N is the number of the fast time signals in $E_3$. After the linear trend subtraction, $E_4^T$ is transposed to get $E_4(l,n)$.

In step 2.5, a low-pass filtering is performed on the signal after the linear trend subtraction in Step 2.4, in the slow time dimension.

Since the hardware of the IR-UWB radar system will inevitably produce noise in a working process, these noises are high-frequency noises relative to the breathing signal of the human body. The breathing signal of the human target is a narrow-band low-frequency quasi-periodic signal. Thus, in order to effectively filter out high-frequency interference and further improve a signal-to-noise ratio of the radar echo, a low-pass filtering is performed on the radar echo signal in the slow time dimension according to the present disclosure:

$$E_5(l,q) = E_4(l,n) * h(t)$$

where $E_5(l,q)$ is the radar data after filtering, "*" represents a convolution operation, h(t) is an impulse function of a Finite Impulse Response (FIR) filter. According to the breathing frequency of the human body, a cutoff frequency of the low-pass filter is set to 0.5 Hz, and an order of the filter is 120. The radar echo signal after the low-pass filtering is $E_5(l,q)$.

In step 2.6, the signal after the low-pass filtering in step 2.5 is accumulated, along a slow time axis, to obtain an energy signal $E_6(l)$.

In the experiment, the experimental data is collected for $t_s$=80 seconds each time; and according to the sampling frequency $f_s$=16 Hz of the slow time signal, it can be known that the data collected each time contains 16×80=1280 fast time signals. That is, the radar echo signal after the low-pass filtering is $Q=t_s f_s=1280$ sampling data in the $E_5(l,q)$. The value of L is obtained after the distance accumulation, which is 200 (200 is obtained from 8192 sampling points of the fast time signal through the distance accumulation, mainly to reduce the computation; this value can be determined freely, and the computation can be reduced once accumulating to 200-1000 points without affecting the signal quality).

Because the steps of removing the average and low-pass filtering in preprocessing require a convergence process, the first 200 (the 200 here is related to a sum of the orders of removing the average and low-pass filtering in the preprocessing; the lower the order, the smaller the value can be, and the higher the order, the larger the value needs to be) fast time signals are not used as a basis for detection and recognition of the target and are eliminated. Absolute values of 1000 (here 1000 is determined by a length of the sampling time, the sampling frequency of 16 Hz corresponds to data sampled every about 62.5 seconds; and the longer the signal sample interval, the larger the value) fast time signals (200-1200) in the $E_5(l,q)$ is calculated, they are accumulated along the slow time axis to form an energy signal $E_6(l)$.

$$E_6(l) = \sum_{n=200}^{1200} |E_5(l, q)|$$

The energy signal $E_6(l)$, (l=1, 2, . . . , 200) is a one-dimensional signal; an abscissa thereof is the fast time, corresponding to distance (m); and an ordinate thereof is an energy amplitude accumulated along the slow time. After a series of signal processing above, the amplitude of the energy signal is closely related to the life signal of the life body. The larger the amplitude, indicating that the stronger the slight movement signal of life at this distance, the more likely it is a human body or biological target.

Specifically, removing the direct wave in the step 3 includes: discarding data of the first 50 points in the $E_6(l)$, and renumbering data of the remaining 150 points as 1-150, to form a new energy signal $E_7(l)$ in which the direct wave is removed.

Specifically, step 4 includes following sub-steps:

In step 4.1, an average of the data of the two sections $1 \sim (l_{max}-12)$ and $l_{max}+25) \sim 150$ of the energy signal obtained in the step 3 is calculated, to obtain a background average $B_{ave}$;

In step 4.2, a peak-to-background ratio $V_{EtoB}$ is obtained by calculating through a following formula:

$$V_{EtoB} = \frac{E_{7max}}{B_{ave}}.$$

In step 4.3, obtaining the slow time signal $E_{max}(n)$ at the position of the maximum value $l_{max}$ of the energy signal is obtained according to $E_5(l,n)$, correlation coefficients of six positions adjacent to the position of the maximum value are calculating, and an average of six correlation coefficients is calculated. The six positions include first three positions and last three positions adjacent to the position.

The slow time signals at positions of $(l_{max}-3)$, $(l_{max}-2)$, $(l_{max}-1)$, $(l_{max}+1)$, $(l_{max}+2)$, $(l_{max}+3)$ are obtained, which are marked as $E_{max-2}(q)$, $E_{max-2}(q)$, $E_{max-1}(q)$, $E_{max+1}(q)$, $E_{max+2}(q)$, $E_{max+}(q)$ respectively. The correlation coefficients between these six slow time signals and $E_{max}(q)$ are calculated. The average $r_m$ of the correlation coefficients at the maximum value is calculated and obtained by the formula IV:

$$\begin{cases} r_i = \dfrac{\sum_{q=1}^{Q}(E_{(max+(i-4))}(q) - \overline{E_{(max+(i-4))}(q)})(E_{max}(q) - \overline{E_{max}(q)})}{\sqrt{\sum_{q=1}^{Q}(E_{(max+(i-4))}(q) - \overline{E_{(max+(i-4))}(q)})^2}\sqrt{\sum_{q=1}^{Q}(E_{max}(q) - \overline{E_{max}(q)})^2}}, i \leq 3 \\ r_i = \dfrac{\sum_{q=1}^{Q}(E_{(max+(i-3))}(q) - \overline{E_{(max+(i-3))}(q)})(E_{max}(q) - \overline{E_{max}(q)})}{\sqrt{\sum_{q=1}^{Q}(E_{(max+(i-3))}(q) - \overline{E_{(max+(i-3))}(q)})^2}\sqrt{\sum_{q=1}^{Q}(E_{max}(q) - \overline{E_{max}(q)})^2}}, i \geq 4 \\ r_m = \dfrac{1}{6}\sum_{i=1}^{6} r_i \end{cases}$$

Formula IV

In formula IV, i represents an ordinal number of correlation coefficient and i=1, 2, 3, 4, 5, 6; $E_5(l,q)$ represents the signal of the middle channel after low-pass filtering in the slow time dimension, obtained in step 2.5; $E_{max}(q)$ represents the signal at the position of the maximum value of $E_5(l,q)$; $E_{max+(i-4)}(q)$ represents the signals at the first three positions adjacent to the position of the maximum value of $E_5(l,q)$; $E_{max+(i-3)}(q)$ represents the signals at the last three positions adjacent to the position of the maximum value of $E_5(l,q)$; Q represents the total number of sampling points of the signal of $E_5(l,q)$ in the slow time direction and Q is a positive integer; and q represents the q-th signal sampling point in the slow time direction and q is a positive integer. The six correlation coefficients calculated according to the above formula are respectively marked as: $r_1$, $r_2$, $r_3$, $r_4$, $r_5$, $r_6$, and the average $r_m$ of the six correlation coefficients at the maximum value of a secondary inflection point signal is calculated.

In step 4.4, establishing a target detection and distinction rule is established and the type of the target is obtained through the target detection and distinction rule.

Verification Experiment and Results

Through-wall detection and verification experiments are conducted in a laboratory by the method for detecting and distinguishing a human and an animal and the IR-UWB bio-radar. In the experiment, a healthy male dog and two healthy young men (target A and target B) were selected for detection experiments under a condition of penetrating a single brick-wall respectively, and distinguishing results are given. The experiment was conducted in 30 groups, which include 10 groups of no target, 10 groups of animal target and 10 groups of single human target. In an experiment of single human target, the two experimental subjects A and B are each detected by 5 groups, and a sensitivity threshold for all data detection is set to 2. The detection and distinction results show that a detection accuracy rate is 90% in the case of no target, and one group of data was misjudged as an animal target; the detection accuracy in the case of a single human target is 80%, and two groups of data are misjudged as an animal due to a relatively small peak-to-background ratio, that is $1.65 \leq V_{EtoB} < 8$ and $0.45 < r_m < 0.92$; the detection accuracy rate for the animal target is 80%, one group of data is misjudged as no target because of $V_{EtoB} < 1.65$, and one group is misjudged as no target because of $1.65\ V_{EtoB} < 8$ and $r_m < 0.45$. The recognition and distinction accuracy rates of the three groups of experiments all reached 80% or more, meeting the requirements of detection and distinction. Here are four experimental data with correct detection results selected as follows:

Experiment 1

Experimental scene: through-wall detection for no target, and the sensitivity threshold is set to 2.

The peak-to-background ratio is $V_{EtoB}=1.809$, $1.65 \leq V_{EtoB} < 2$; in this case $r_m=0.095$, $r_m<0.45$. Then the determination result is no target, and the determination result is correct.

Experiment 2

Experimental scene: through-wall detection for the animal target (dog), and the sensitivity threshold is set to 2.

The peak-background ratio is $V_{EtoB}=3.309$, $2 \leq V_{EtoB} < 8$; the average of the correlation coefficients is $r_m=0.707$, $0.45 \leq r_m \leq 0.92$. Then the determination result is an animal target, a distance is 3.32 meters behind the wall, and the determination result is correct.

Experiment 3

Experimental scene: through-wall detection for the human target, and the sensitivity threshold is set to 2.

The peak-to-background ratio is $V_{EtoB}=3.69$, $2 \leq V_{EtoB} < 8$; the average of the correlation coefficients is $r_m=0.9257$, $r_m>0.92$. Then, the determination result is a human target, the distance is 4.51 meters behind the wall, and the determination result is correct.

Experiment 4

Experimental scene: through-wall detection of the human target, and the sensitivity threshold is set to 2.

The peak-to-background ratio is $V_{EtoB}$=11.04, $V_{EtoB}$>8. It is directly determined as a human target, the distance is 3.64 meters behind the wall, and the determination result is correct.

What is claimed is:

1. A non-contact method for detecting and distinguishing a human and an animal based on Impulse-Radio Ultra-Wideband (IR-UWB) bio-radar signals, comprising:

step 1: transmitting a radar pulse to a target by a transmitting antenna of an IR-UWB bio-radar, obtaining a radar echo signal E(n,m) through a receiving antenna of the IR-UWB bio-radar, wherein the radar echo signal is generated from the radar pulse reflected on the target, m is a sampling ordinal number in a fast time direction, n is a sampling ordinal number in a slow time direction, and m and n are positive integers;

step 2: performing signal preprocessing on the radar echo signal E(n,m) obtained in the step 1, to obtain a first energy signal $E_6(l)$;

step 3: removing a direct wave from the first energy signal $E_6(l)$ obtained in the step 2 to obtain a second energy signal $E_7(l)$, and obtaining a maximum amplitude $E_{7max}$ of the second energy signal $E_7(l)$ and a position $l_{max}$ corresponding to the maximum amplitude in the slow time direction; and step 4: calculating a peak-to-background ratio $V_{EtoB}$ of the second energy signal $E_7(l)$, and calculating an average correlation coefficient $r_m$, and determining a type of the target through a target detection and distinction rule, wherein the target detection and distinction rule comprises:

a) if $V_{EtoB} < \sigma_N$, a determination result is no target;

b) if $\sigma_N \leq V_{EtoB} < \sigma_Y$ and $r_m < \sigma_{rm1}$, the determination result is no target;

c) if $V_{EtoB}$ the determination result is a human target;

d) if $S_{thres} \leq V_{EtoB} < \sigma_Y$ and $r_m > \sigma_{rm2}$, the determination result is a human target; and f) in cases other than a), b), c), and d), the determination result is an animal target;

where $\sigma_N$ represents a no target threshold; $\sigma_Y$ represents a human target threshold; $S_{thres}$ represents a sensitivity threshold and $\sigma_N < S_{thres} < \sigma_Y$; and $\sigma_N$, $\sigma_Y$, and $S_{thres}$ are larger than 1; $\sigma_{rm1}$ represent a weak correlation threshold; $\sigma_{rm2}$ represents a strong correlation threshold and $\sigma_{rm1} < \sigma_{rm2}$; $\sigma_{rm1}$ and $\sigma_{rm2}$ are both larger than 0 and smaller than 1.

2. The non-contact method for detecting and distinguishing a human and an animal based on IR-UWB bio-radar signals according to claim 1, wherein in the step 4, $\sigma_N$=1.65, $\sigma_Y$=8, $\sigma_{rm1}$=0.45, $\sigma_{rm2}$=0.92, and $S_{thres}$={2, 3, 3.8}.

3. The non-contact method for detecting and distinguishing a human and an animal based on IR-UWB bio-radar signals according to claim 1, wherein the signal preprocessing in the step 2 comprises:

step 2.1: performing a distance accumulation on the radar echo signal E(n,m);

step 2.2: multiplying a signal after the distance accumulation in the step 2.1 by an exponential gain curve G(l) of a formula I, to perform attenuation compensation, $$G(l) = \exp\left(\frac{lg(V_h)}{P} \times l\right) \quad \text{Formula I}$$

where $V_h$ represents a ratio of the maximum of the radar echo data to an amplitude of a target reflection echo, P represents a target position in units of m, l represents a fast time ordinal number after the distance accumulation, l=1, 2, . . . , L, and L is a positive integer;

step 2.3: removing a static clutter from the signal after the attenuation compensation in the step 2.2;

step 2.4: performing a linear trend subtraction from the signal after the static clutter is removed in the step 2.3;

step 2.5: performing, in the slow time dimension, low-pass filtering on the signal after the linear trend subtraction in the step 2.4; and step 2.6: accumulating, along a slow time axis, the signal after the low-pass filtering in the step 2.5, to obtain the first energy signal $E_6(l)$.

4. The non-contact method for detecting and distinguishing a human and an animal based on IR-UWB bio-radar signals according to claim 3, wherein the average correlation coefficient $r_m$ at a position of the maximum amplitude is calculated and obtained by a formula II:

$$\begin{cases} r_i = \dfrac{\sum_{q=1}^{Q}(E_{(max+(i-4))}(q) - \overline{E_{(max+(i-4))}(q)})(E_{max}(q) - \overline{E_{max}(q)})}{\sqrt{\sum_{q=1}^{Q}(E_{(max+(i-4))}(q) - \overline{E_{(max+(i-4))}(q)})^2}\sqrt{\sum_{q=1}^{Q}(E_{max}(q) - \overline{E_{max}(q)})^2}}, i \leq 3 \\ r_i = \dfrac{\sum_{q=1}^{Q}(E_{(max+(i-3))}(q) - \overline{E_{(max+(i-3))}(q)})(E_{max}(q) - \overline{E_{max}(q)})}{\sqrt{\sum_{q=1}^{Q}(E_{(max+(i-3))}(q) - \overline{E_{(max+(i-3))}(q)})^2}\sqrt{\sum_{q=1}^{Q}(E_{max}(q) - \overline{E_{max}(q)})^2}}, i \geq 4 \\ r_m = \dfrac{1}{6}\sum_{i=1}^{6} r_i \end{cases} \quad \text{Formula II}$$

where i represents an ordinal number of correlation coefficient and i=1, 2, 3, 4, 5, 6; $E_5(l,q)$ represents a signal of a middle channel after the low-pass filtering in the slow time dimension, obtained in the step 2.5; $E_{max}(q)$ represents a signal at a position of the maximum of $E_5(l,q)$; $E_{max+(i-4)}(q)$ represents signals at the first three positions adjacent to the position of the maximum of $E_5(l,q)$; $E_{max+(i-3)}(q)$ represents signals at the last three positions adjacent to the position of the maximum of $E_5(l,q)$; Q represents the total number of sampling points of the signal of $E_5(l,q)$ in the slow time direction and Q is a positive integer; and q represents the q-th signal sampling point in the slow time direction and q is a positive integer.

* * * * *